(12) United States Patent
Gengenbach (10) Patent No.: US 6,672,042 B2
(45) Date of Patent: Jan. 6, 2004

(54) SWEEPER APPARATUS FOR A CORN HEAD ATTACHMENT

(76) Inventor: Douglas K. Gengenbach, 43698 Drive 751, Lexington, NE (US) 68850

( * ) Notice: Subject to any disclaimer, the term of this patent is extended or adjusted under 35 U.S.C. 154(b) by 0 days.

(21) Appl. No.: 10/002,443

(22) Filed: Nov. 14, 2001

(65) Prior Publication Data

US 2002/0073673 A1 Jun. 20, 2002

Related U.S. Application Data

(60) Provisional application No. 60/248,945, filed on Nov. 14, 2000.

(51) Int. Cl.[7] .............................................. A01D 45/02
(52) U.S. Cl. ....................................................... 56/119
(58) Field of Search .......................... 56/119, 103, 112, 56/364, 400, 502, 504, 505

(56) References Cited

U.S. PATENT DOCUMENTS 3,584,444 A * 6/1971 Sammann et al. ............ 56/119
3,719,034 A * 3/1973 Lange ........................... 56/119
4,344,276 A * 8/1982 Sund ............................. 56/364
4,476,667 A * 10/1984 Moss ............................ 56/119

* cited by examiner

*Primary Examiner*—Árpád Fábián Kovács (57) ABSTRACT

A sweeper apparatus for attachment to corn heads mounted on combines used in harvesting corn. The apparatus includes pivotally movable extended arms which are mounted on the corn head and are positionally adjusted with respect to the corn head by hydraulic cylinders. The outer ends of the arms support a rotatable axel which is driven by an adjustable speed motor and drive assembly. A plurality of spaced paddle assemblies are moveably attached to the rotatable axel. Spacers having various lengths are positioned over the axel and between the paddle assemblies to properly space and align the paddle assemblies to correspond to various corn heads. Each paddle assembly includes a hub and a plurality of vanes with a triangular support plate positioned between the vanes to support the vanes. The shape of the vanes and hub, the inclusion of the triangular support plates and the paddle assembly spacers prevent clogging of the corn and debris in the sweeper apparatus and in the corn head.

18 Claims, 14 Drawing Sheets

SWEEPER APPARATUS FOR A CORN HEAD ATTACHMENT

Related applications. The within application is based upon the provisional application, Serial No. 60/248,945, on the same name and inventor, filed on Nov. 14, 2000 in the U.S. Patent and Trademark Office.

The present invention relates to an improved method of harvesting corn and more specifically to an attachment apparatus to be used on combine and corn head combinations. The apparatus inhibits debris buildup on the corn head and the intake mechanism for the combine. By avoiding debris buildup it aids the operator in avoiding the necessity of stopping the combine and turning off the power apparatus in order to clear the debris. The debris buildup can occur even in normal harvesting conditions, but is much worse when the corn stalks in some of the rows or parts of the field had been blown down due to wind, storms or snow. Often the operator will try to clear the debris by hand while the machine is still running in order to save time. This method of debris removal is exceptionally dangerous due to the moving machinery and rotating machinery which can grab loose clothing or catch hands, legs or feet.

The invention also allows for adjustment of the apparatus to enable the same apparatus to be used on corn heads of many different manufacturers and move from one corn head to another corn head. Additionally, the adaptability of the apparatus allows for varying the spacing of the rows which can occur from field to field and for the spacing and number of rows in a particular corn head. The apparatus also allows for raising and lowering of the working paddles, which aids in the debris movement and aids harvesting by allowing the paddles to be raised when the apparatus is not needed and lowered to the appropriate height when needed. Another means of adjustability that the apparatus includes is the use of a hydraulic motor that is not a direct drive motor. This allows for the changing of sprockets which in turn changes the gear ratio of the rotation of the paddles and the constant speed hydraulic motor. With the indirect drive of the paddle axle and thus the speed of rotation of the paddles the apparatus may be used on older as well as newer machines. Newer machines have increased their speed of operation to two times the speed of older machines.

The apparatus is also specifically designed to avoid debris buildup and prevent debris from wrapping around the essential structural members of the apparatus and to prevent debris from wrapping around the rotating paddles, which are used to remove and force debris into the harvesting corn head mechanism.

BACKGROUND OF THE INVENTION

Harvesting corn has become a very mechanized operation. The machinery uses a combine with an attached corn head. The corn head operates to cause the corn stalks to be moved into the combine where the corn and kernels are separated from the stalks and debris. The corn head attachment is comprised of corn head fingers that go between the rows of corn like a comb goes through hair. On the opposing surfaces of the fingers there are snapping chains with protrusions that take the corn stalks and break them off from the root section. After the stalks are freed from the root section of the corn stalks, the corn head moves the stalks along with any other leaves or other debris that may be picked up from the field, and moves them rearward to an auger. The auger then moves the stalks and corn to the center of the corn head, where the stalks and corn are transported rearward into the combine machines, where the corn and kernels are separated from the other material that has been harvested.

The corn head mechanism often becomes blocked by buildup of stalks, weeds or other debris that are picked up from the field and buildup either on top of the fingers of the corn head or in front of the auger. This blockage prevents the free flow of the stalks and corn through the mechanism back to the combine. The use of broom handles, sticks or people getting out of the combine to and using their feet to dislodge this debris blockage is well known and a common source of injury and death. There have been adaptations of mechanized brushes that seek to unblock the debris barriers, but they have major shortcomings which are addressed by the within invention. Some of these drawbacks include the structure of the apparatus which was itself a barrier and cause of debris blockage. Additionally, the apparatus had to be permanently or semi permanently attached to the corn head and thus became a dedicated part of one and only one corn head. The paddles or brush structure was itself a major cause of debris buildup and wrapping of debris around the rotating brushwork paddle area. The speed in the earlier apparatus was constant. Because the apparatus was a direct drive system there was no capability of adjusting the speed of rotation for various purposes.

The present invention is an improvement over a prior art sweeper apparatus designed by the inventor, as depicted in, FIGS. 19, 20, 21, 22 and 23. This prior art design had drawbacks that are addressed in the current design and as disclosed and explained in this application.

The problems addressed herein include:

a) multiple support arms which allowed collection of debris;

b) a direct drive motor which did not allow for changing the speed of rotation to match the different speeds that various models of combines move down the row. Modern combines can move faster than older combines, but without the ability to have the sweeper rotate at different speeds, the combine's faster capabilities would not be usable, thus the sweeper could not be used on different combines;

c) the method to attach the sweeper to a corn head was too cumbersome and required drilling and major anchoring, which made it very difficult to move the sweeper to a different corn head, thus, the sweeper could not be easily used on different corn heads;

d) The means of attaching the paddle assemblies to the axle and the paddle assembly design created too many areas to collect debris and allowed the debris to be too caught up in the axle;

e) with the ability to move the sweeper to different corn heads, the adjustments of the sweeper are more important and new adjustments were needed; and f) the axle for the paddle assemblies became a debris collector and this was corrected in the new design.

The present invention addresses the aforementioned problems with corn heads and with prior methods used to attempt to solve the problems.

SUMMARY OF THE INVENTION

The present invention provides great improvement over previous corn harvesting machines and add-on apparatus. One of the purposes of the present invention is to allow for adjustments in the apparatus to accommodate different manufacturers of corn heads, different corn heads and to allow for moving the apparatus from one corn head to another, adjusting for different row spacing of corn rows and for different numbers of rows in a particular corn head whether they be 4, 8 or 12 rows. Additional adjustment capability includes the speed of rotation of the paddle assembly, which thus aids the variable speed at which various combine machines operate.

The present invention also avoids the debris problem which has occurred whereby the structure of the apparatus, such as support arms and paddles, have themselves become the debris accumulators. The present invention uses one or two support arms, thus minimizing the structural supports that may become the collectors of the debris. Additionally, the assembly of the paddles is such that there are fewer rotating bars for rods that tended to collect string, debris, weeds or other material which is common in corn fields. The unique paddle assembly is both easy to construct and efficient in material usage and in its structure. The paddle structure is specifically designed to avoid being the location of and source of wrapping of debris and by its structure actually cuts through various types of debris.

DETAILED DESCRIPTION OF THE PRESENT INVENTION

The preferred embodiment of the present invention is as shown in FIGS. 2 through 5, and 9.

Figure 9:
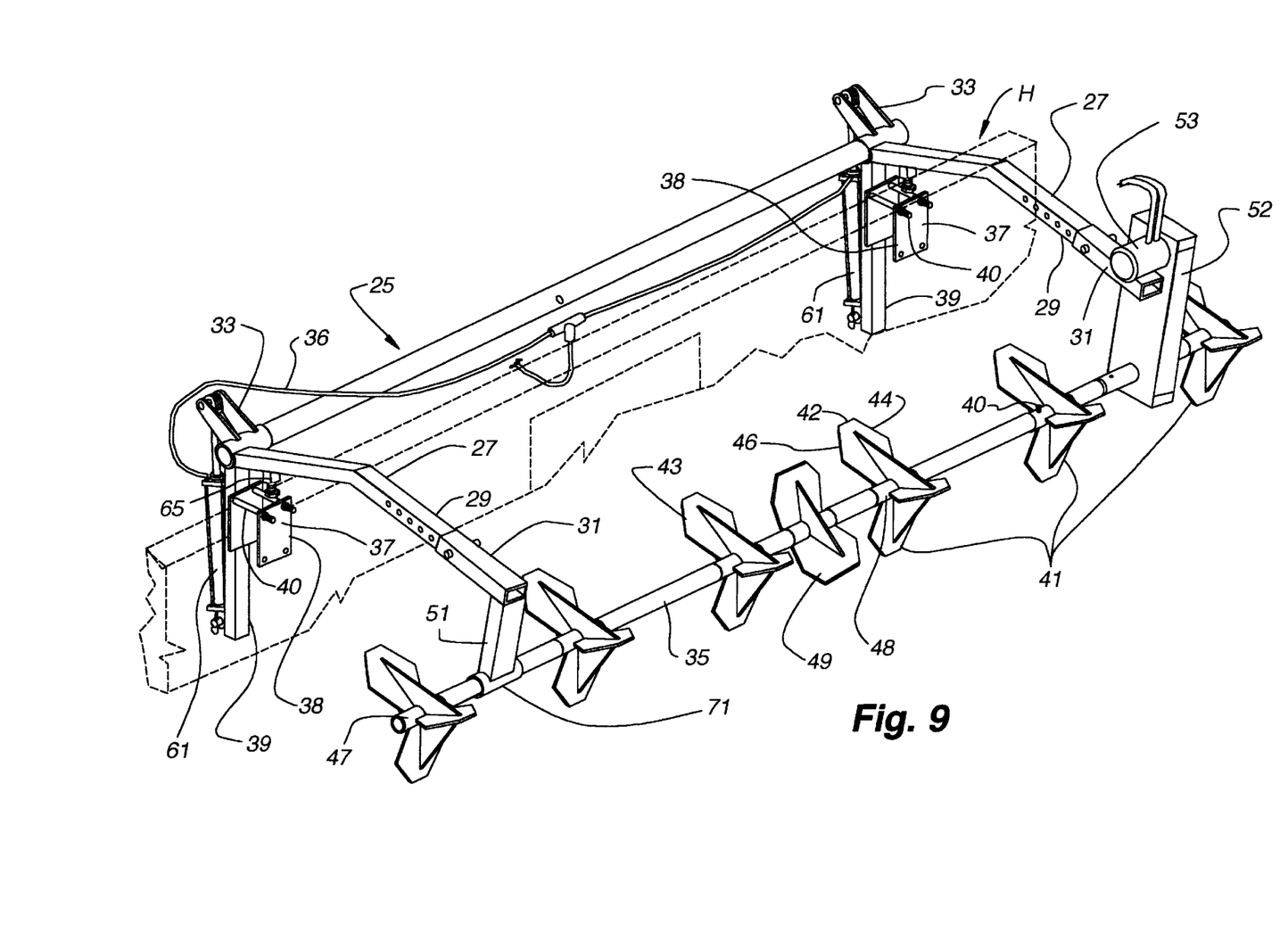
FIG 9. is a perspective view of the attachment without the corn head mechanism.

The apparatus (25) as shown in FIG. 9 is an attachment to be fitted and mounted on corn head attachments H for corn harvesting. The apparatus or sweeper (25) will allow for easy attachment and easy removal of the attachment from various types of corn head attachments. The sweeper (25) is made up of the following components which comprise the basic frame of the sweeper: support arms (27) connect the clamps (37) or attachment means of the invention to the axle (35) with its attached drive motor (53) and attached paddle assemblies (41). The attachment is connected to the corn head by clamps (37). The clamps fit over the corn head back frame. The front portion is a plate (38) attached by way of tightening screws or nuts and bolts (40) with a rear portion that includes a vertical support bar (39). A hydraulic cylinder (61) is attached to the rear vertical support bar (39). The hydraulic cylinder is attached and supported by the support bar with the piston (63) attached to the lever arms (33) of the support arms (27). The support arm is rotatably attached to the clamps at pivot point (34) such that when the hydraulic piston is extended it moves the lever arms (33) up and the support arm (27) with the rotating paddle assemblies (41) are lowered into position, the paddle vanes (43) being between the fingers of the corn head attachment. When the hydraulic piston moves downward it in turn moves the lever arms (33) downward, the support arm (27) pivots around the pivot point (34) and is lifted up and out of the vicinity of the fingers of the corn head attachment. Thus, the invention may be lowered when debris is building up and raised out of the way when there is no buildup of debris.

On the bottom of the support arm (27), in a position to interact with the top of the corn head attachment frames, there is a height adjustment means such as a height adjustment screw (65). This is used to do fine adjustments to the position of the support arms (27) in the vertical position. Thus, the paddle assemblies (41) lowered by the hydraulic cylinder (61) can be finely adjusted to be close to the corn head fingers and working mechanism without interference. Without this adjustment the vertical position would be hit or miss with the hydraulic cylinder (61), or fixed and not alterable. This adjustment in conjunction with the flexible spacing of the paddle assemblies and placement and the horizontal adjustment of the support arms, allows for complete flexibility and operation optimization.

Figures 14, 15, 16:
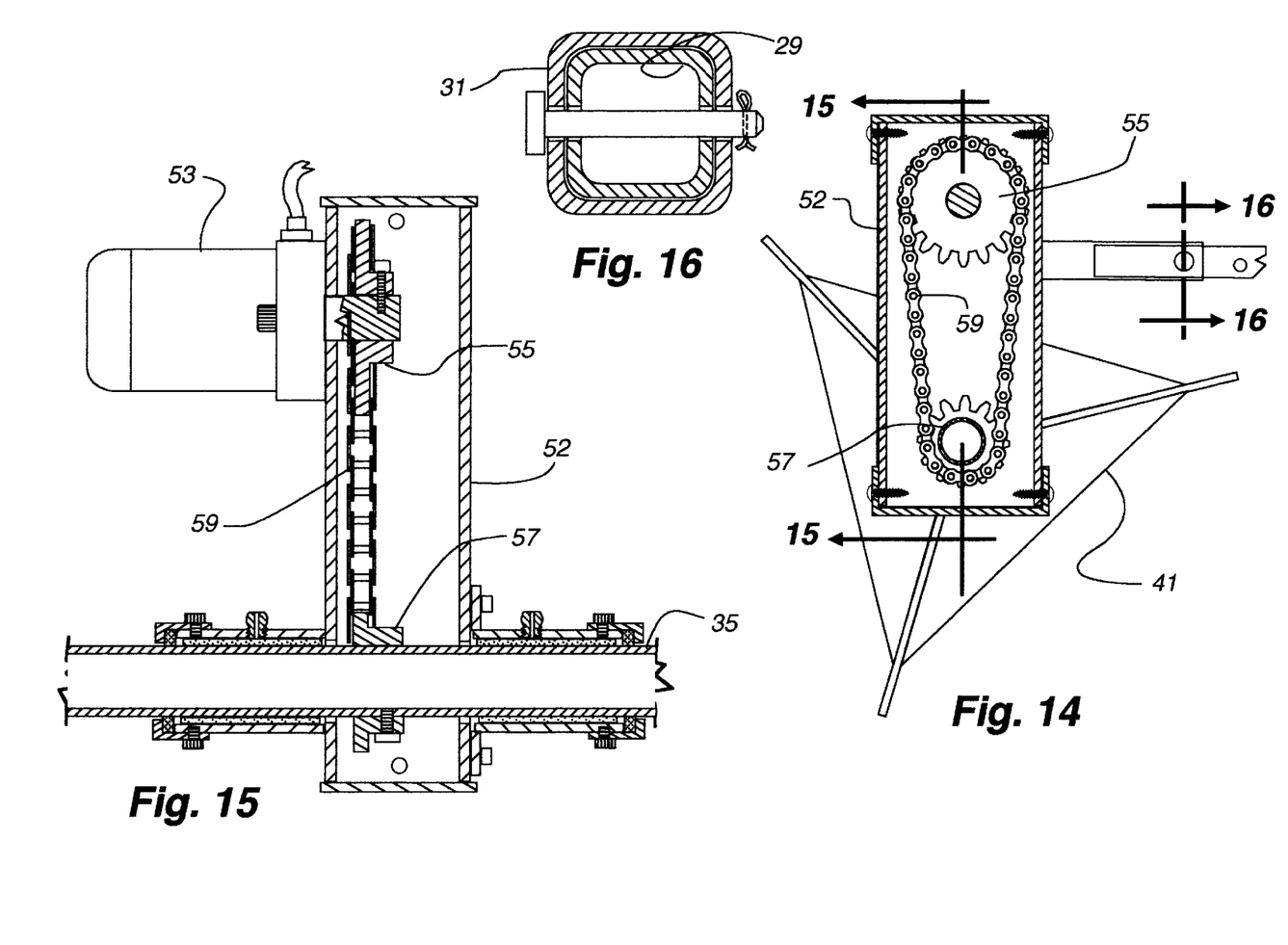
FIG. 14. is a sectional view of the drive chain housing of the hydraulic motor showing the drive sprocket.
FIG. 15. is a sectional view along section line 15—15 of FIG. 14 showing the drive sprocket chain and axle sprocket.
FIG. 16. is a sectional view of the invention structural support arms arm showing the section view along line 16—16 of FIG. 14.

At the forward end of the support arms (27) is a connection arm (51) and a connection box (52) that connects the support arms (27) to the axle (35). Inside this connection box are two sprockets. The drive sprocket (55) in FIG. 14 and FIG. 15 is attached to the drive motor shaft (53). The drive sprocket is operationally connected to the axle sprocket (57) for the axle (35). The axle sprocket (57) is removably attached to the axle (35) to allow for the rotational force transmitted to the axle sprocket (57) to be transmitted to the axle (35). In the described embodiment the attachment between the drive sprocket and the axle sprocket is by chain (59). The attachment and fixation of the axle sprocket (57) to the axle (35) is by any common suitable attachment means that allows for the changing of the axle (35) for different lengths such as for four row, eight row or twelve row corn heads.

Figure 6:
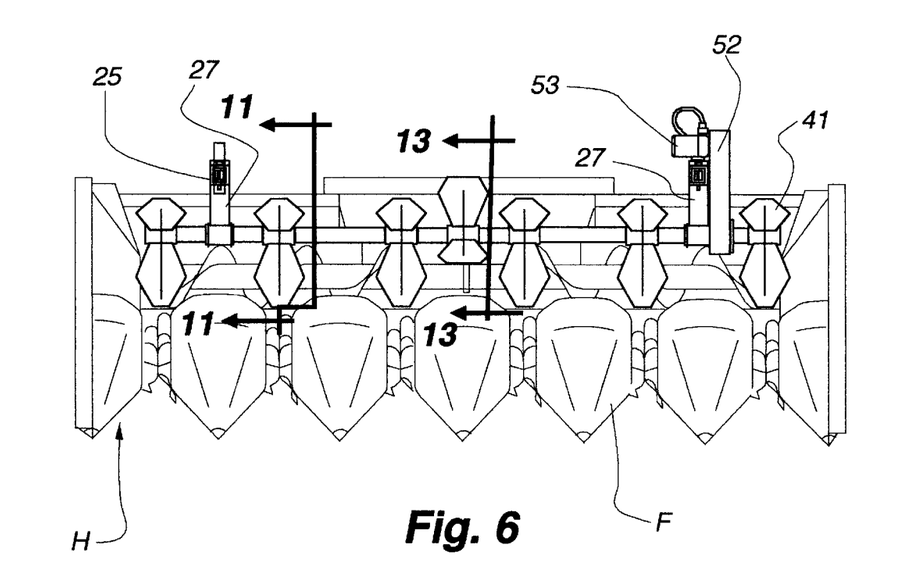
FIG. 6. is a front view of the corn head with the apparatus in a down configuration with the paddle assemblies situated between the fingers of the corn head attachment to help force the stalks and other debris back into the feeder auger.
Figure 7:
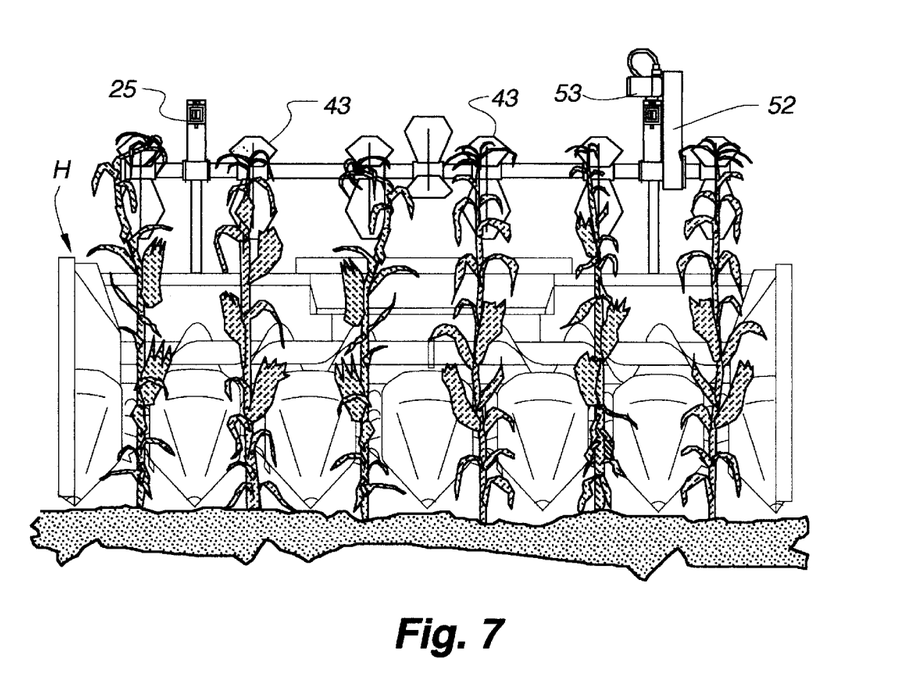
FIG. 7. is a front view, showing the attached invention in an up condition with upright corn stalks.
Figure 8:
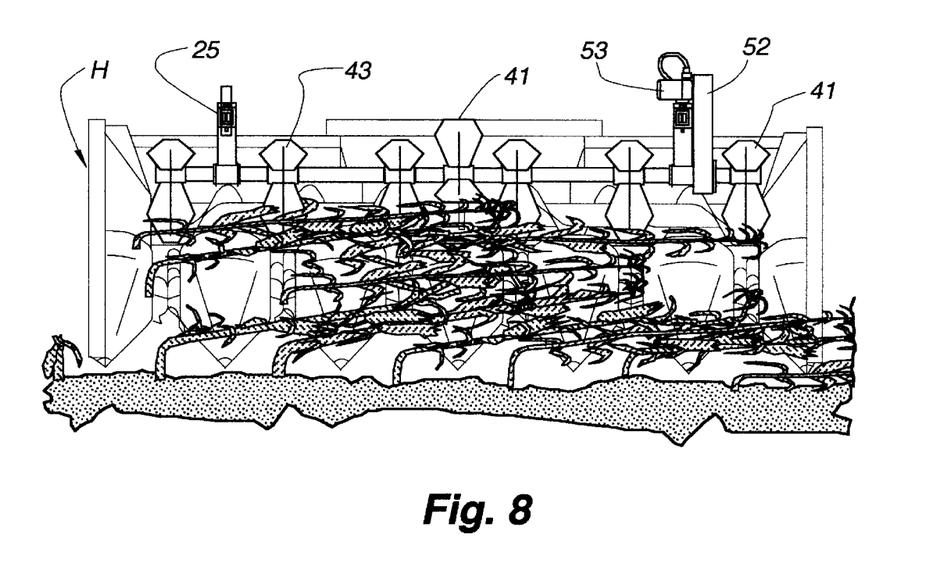
FIG. 8. is a front view of the corn head showing the invention in a down configuration to force the corn stalks that are is horizontal or down in the field.
Figure 10:
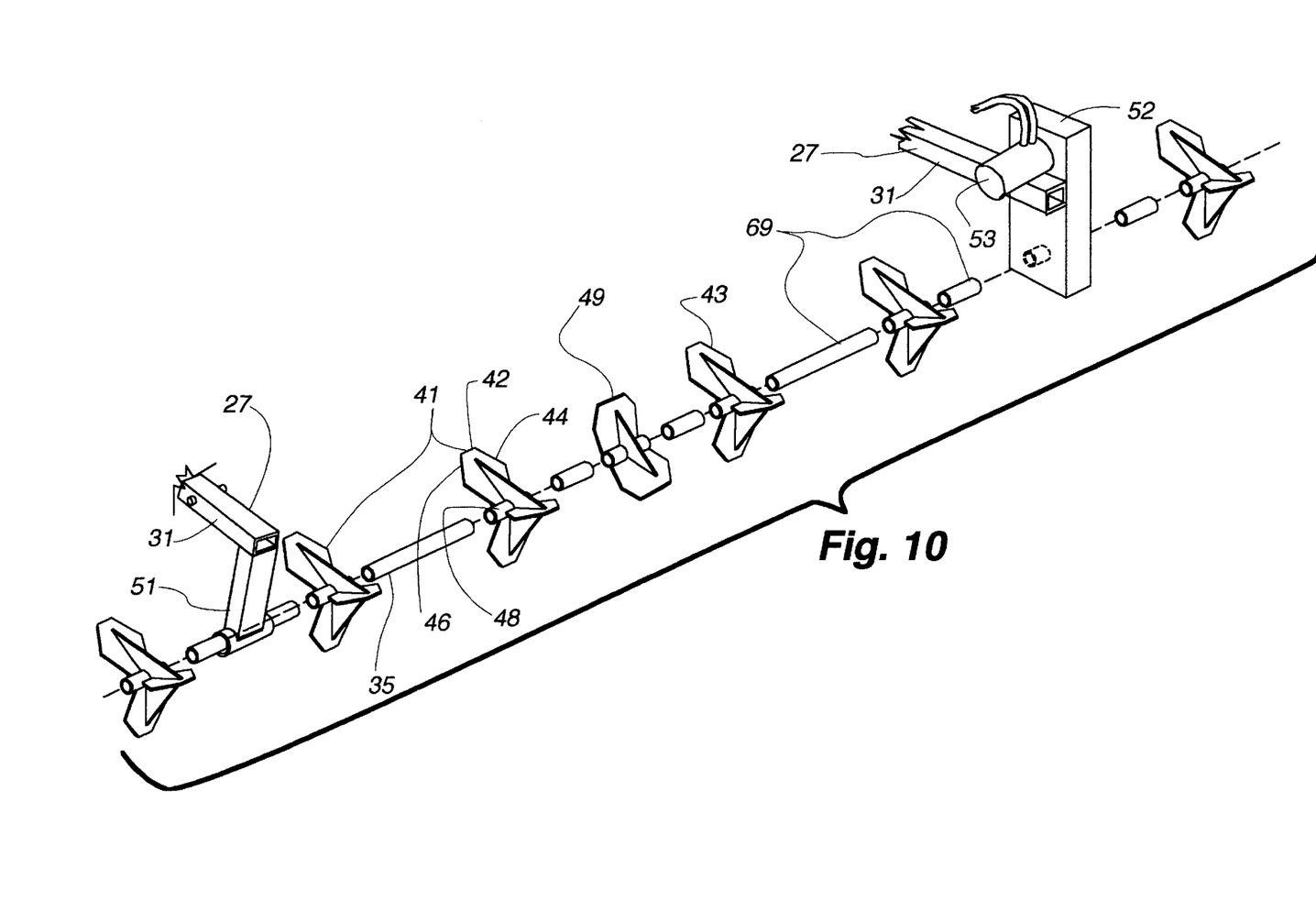
FIG. 10. is an exploded perspective view of the invention with paddles and spacers along the drive axle.
Figures 11, 12:
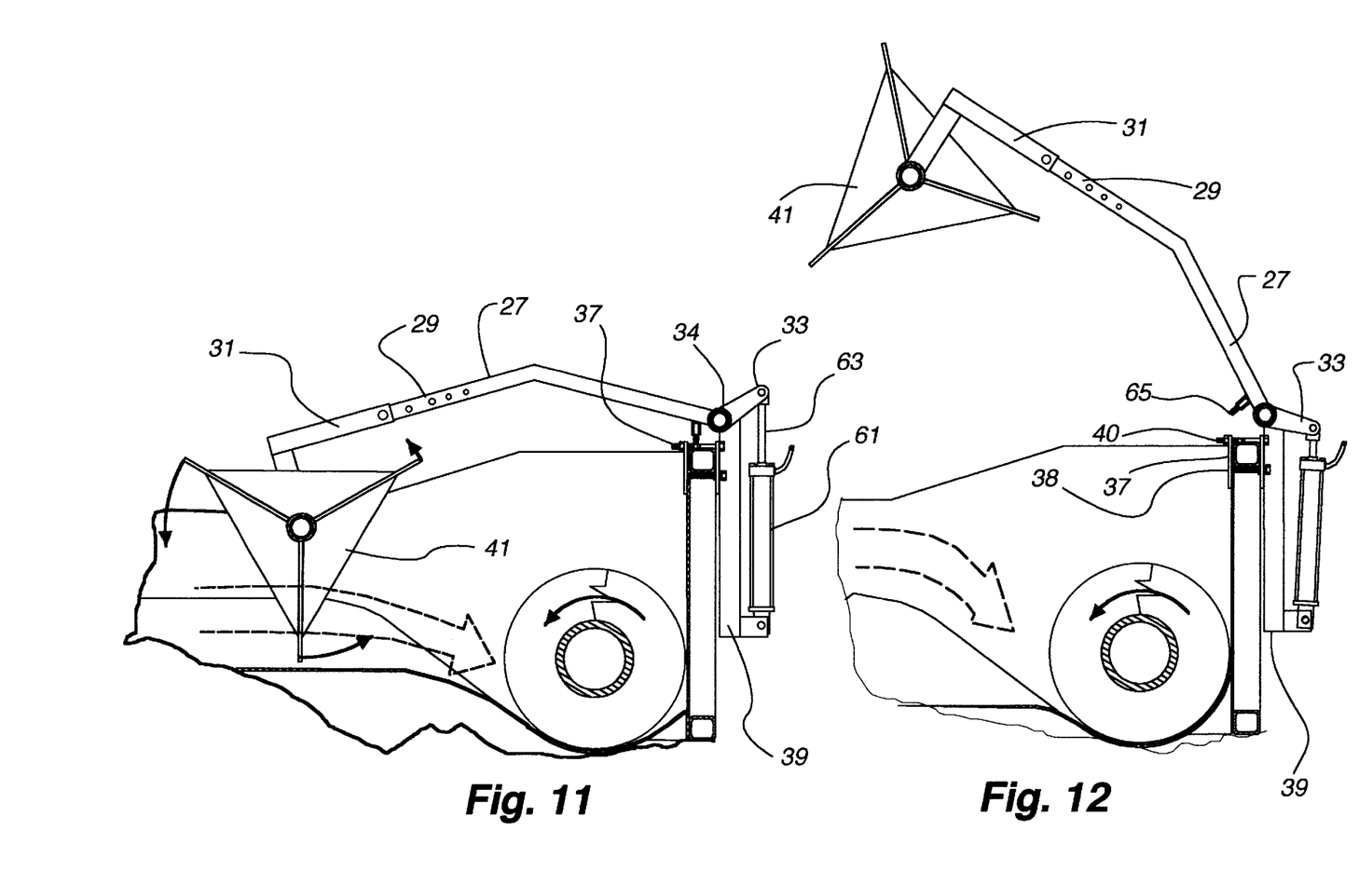
FIG. 11. is a partial side view of the corn head attachment with an invention paddle assembly in a down position illustrating how the paddles move the stalks and other debris rearward into the auger feeder.
FIG. 12. is a partial side view similar to FIG. 11 with the apparatus and invention paddle assembly in an up position.

The paddle assemblies (41) are located on the axle and positioned to be between the fingers of the corn head attachment as shown in FIG. 6. The means of spacing the paddles are by common means. The preferred method is shown on the axle illustrated in FIG. 10. The paddle assemblies (41) are separated as desired by spacers (69). These spacers as shown are cylinders made of metal, rubber or plastic suitable to operate as passive spacers between the paddle assemblies (41) which are secured to the axle (35). The spacers operate to keep the paddles positioned laterally along the axle and also operate to keep debris from getting wrapped around the axle underneath the paddle assemblies. The spacers (69) are sufficiently large to fit over the axle but not so large that there will be play or areas where debris may collect or alternatively the spacers may be sized to allow the axle clamp to nest inside the ends of the spacers. The positioning of the paddle assemblies can be accomplished by other means, such as set screws, collars, clamps or other suitable devices.

The adjustment of rotational speed is made by changing the drive sprocket (55). By increasing the sprocket or decreasing the sprocket size, the ratio of the transmission of the rotational force from the hydraulic motor to the axle is altered. Thus, for newer combines (C) that can operate at 6 mph, the ratio may be changed to allow a faster rotation of the paddle axle. For older machines, those that cannot operate at greater than 2 mph, a different ratio is selected.

The paddle assemblies (41) are located at the desired points along the axle and are held in place by set screws (40) or other suitable attachment means to ensure that the paddle assembly rotates in conjunction with the axle and such that the paddle does not have freedom to move along the axle.

The axle (35) may be changed to a desired length for the particular corn head attachment (such as four row, eight row, or 12 rows). The spacers (69) can be changed with the attachment of the paddle assemblies to allow for rows of 20 inches 30 inches or what ever spacing of rows the particular field has.

The adjustment of rotational speed is made by changing the drive sprocket (55). By increasing the sprocket or decreasing the sprocket size, the ratio of the transmission of the rotational force from the hydraulic motor to the axle is altered. Thus, for newer combines (C) that can operate at 6 mph, the ratio may be changed to allow a faster rotation of the paddle axle. For older machines, those that cannot operate at greater than 2 mph, a different ratio is selected.

As was in the older type of apparatus, if the hydraulic motor were a direct drive motor this adjustability of the rotational speed could not be accomplished.

Figure 1:
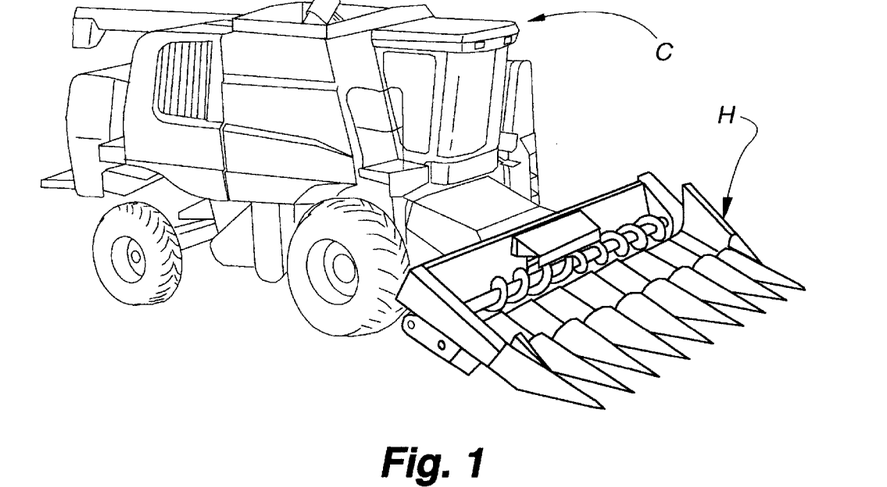
FIG. 1. is a pictorial view of a combine with the corn head attachment attached.
Figure 2:
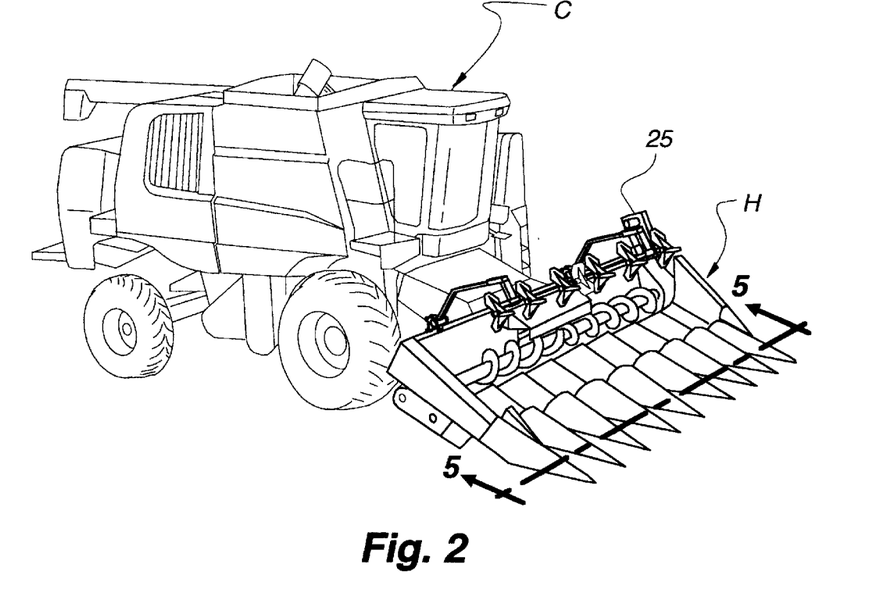
FIG. 2. is a pictorial view of a combine and corn head attachment as shown in FIG. 1 with the attachment of the invention in an up configuration.
Figure 3:
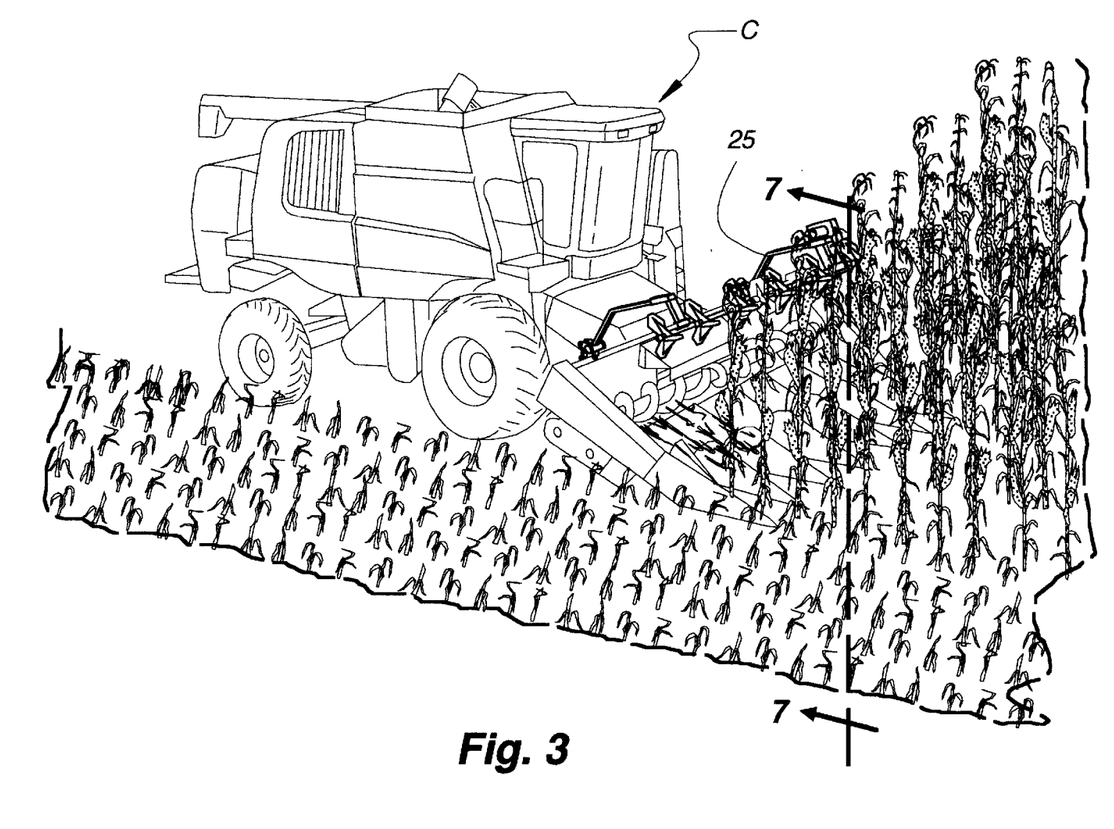
FIG. 3. is a pictorial view of a combine and corn head combination with the invention attached in an up configuration as it goes through a stand of corn which is in a vertical condition.
Figure 4:
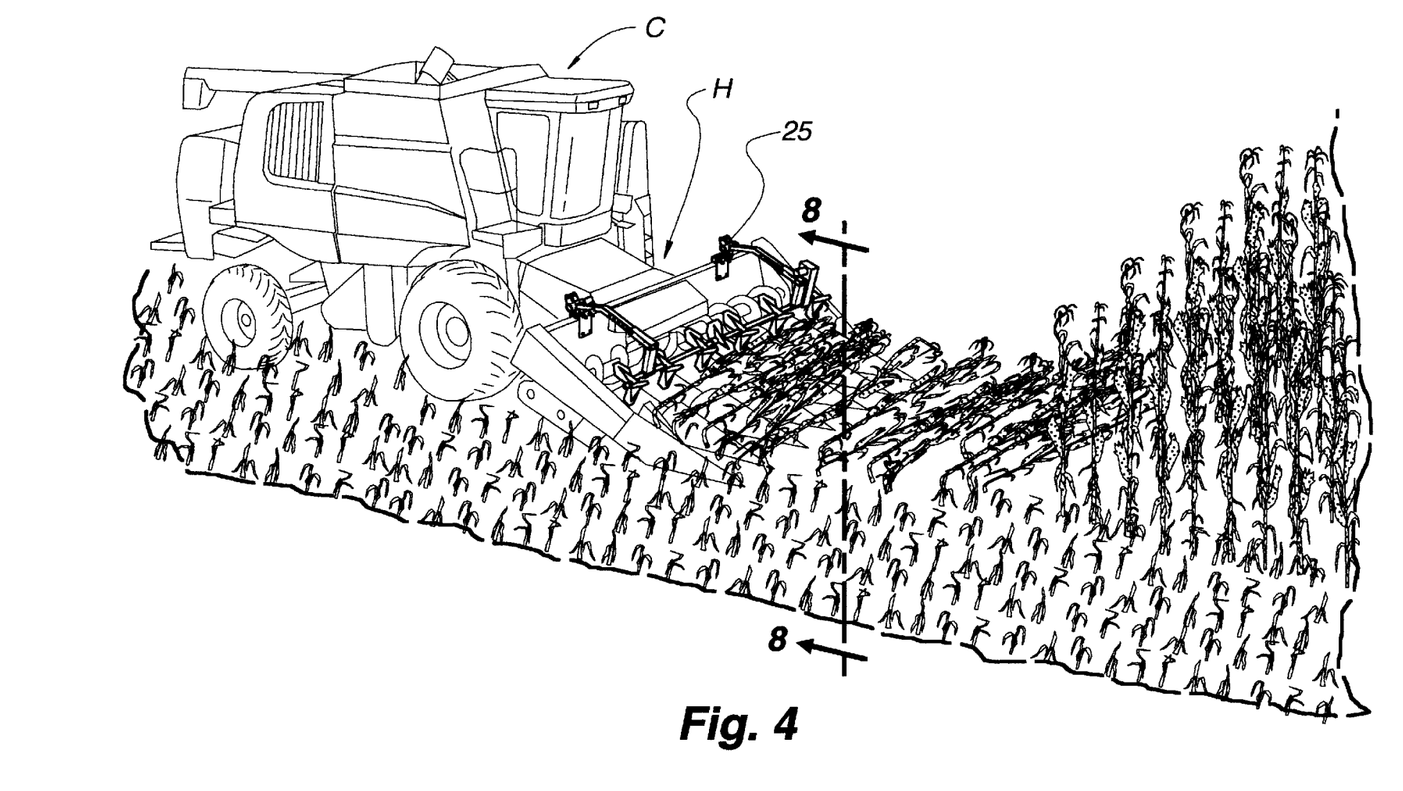
FIG. 4. is a pictorial view of a combine corn head with attachment in a down configuration showing how it helps to harvest blown down or fallow corn stalks.
Figure 5:
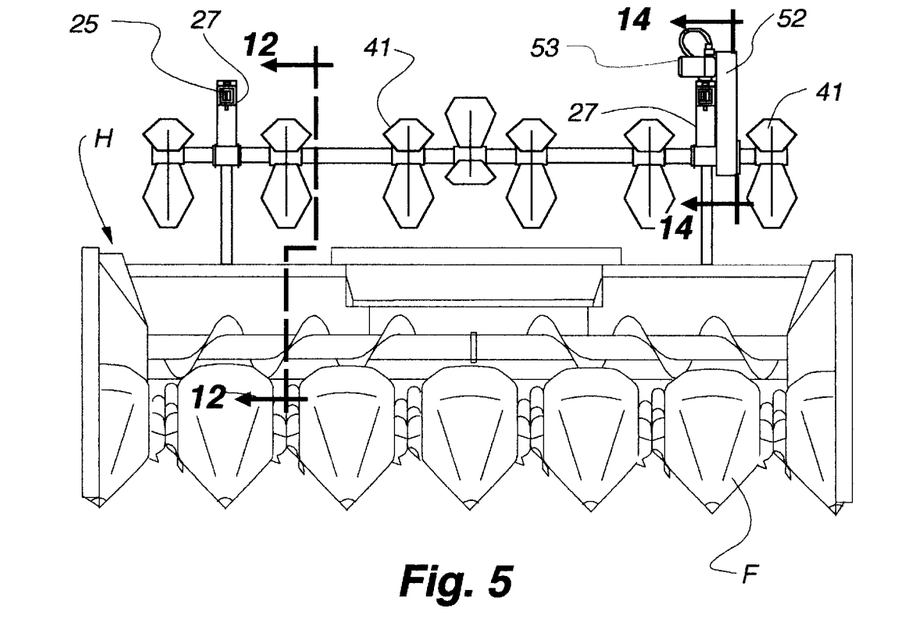
FIG. 5. is a front view of the corn head attachment with the invention attached in an up configuration showing the paddle assemblies.
Figure 13:
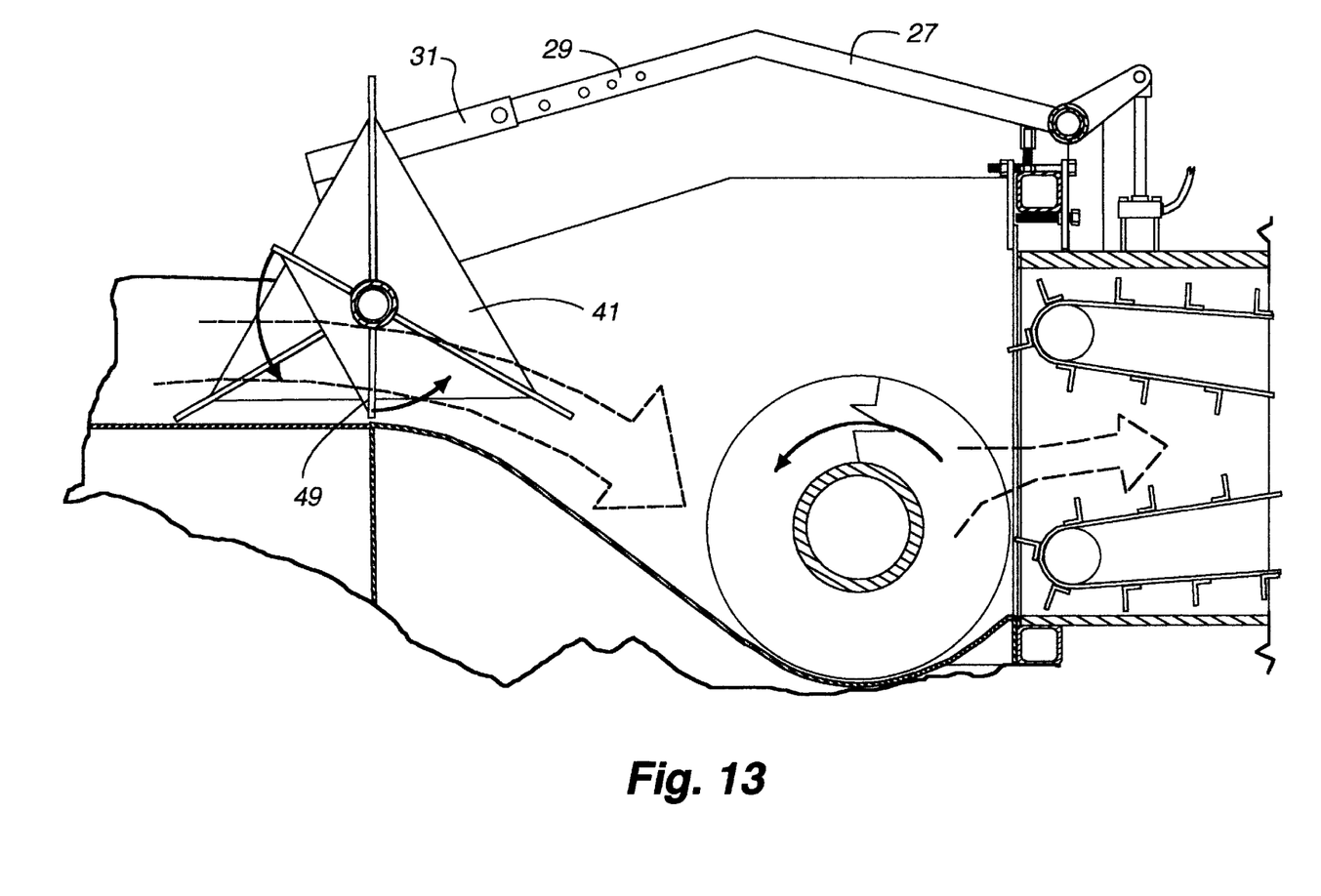
FIG. 13. is an extended partial side view with the invention paddle assembly in a down position and the auger feeding the stalks and corn to the combine.

As illustrated, the sweeper or invention (25) has two support arms (27). This can be reduced to 1 if the horizontal span of the corn head is not great. With two support arms (27) the end opposite the motor connection box (52) is supported with a support leg (51) and an axle support (71). This axle support is a passive cylindrical bushing with bearings to give horizontal and vertical support to the axle while allowing the axle to rotate freely. On the axle, located in the middle of the corn head, is a center paddle (49). This paddle (49) is situated in the middle of the corn head to help the corn head process the corn and corn stalks fed to the center of the corn head by way of the feeder augers. Often the debris will accumulate in this location and build a dam or barrier to prevent the free flow of the corn and corn stalks into the center area and thus prevent this material from being forced into the combine for processing. As seen in FIG. 5, augers on each side of the corn head feed the material to the center. In FIG. 13 materials are moved rearward to the combine for processing. The center paddle (49) aids movement of the accumulated corn, material and stalks and pushes them into the center feeder chute for the combine (C).

The support arms (27) are adjustable in a horizontal direction forward or rearward to allow for the paddle assembly to be properly positioned. Various g designs of corn heads have different finger configurations some longer some shorter. The adjustment for the support arms (27) allows for the fine adjustments of the invention to be a proper working location for any given corn head attachment. In the illustrated embodiment, the adjustment is accomplished by having the support arms (27) in two pieces, the inside arms (29) and the outside arms (31). The inside arms slidably move inside the outside arm. The position desired for the length of the support arms is fixed by way of removable pins that fit through matching holes of the inside and outside support arms. Alternate means of fixing the position for the assembly of the support arms are readily known and understood. They may include set screw or hydraulic pistons within or outside of the support arms.

The design of the support arm (27) or arms to as few a number as possible, one or two improves the operation of the sweeper by minimizing the areas where debris can be caught on the sweeper frame. In circumstances where there are covers or structures on top of the corn head attachment, the debris from the field gets wrapped around this structural member. This may be corn stalk material, wire, string or other material and it tends to collect and wrap around any structural member. The accumulation starts in small amounts, but eventually accumulates more and more until it becomes a barrier for the efficient and proper operation of the corn head. The present invention uses one or two structural arms and thus minimizes the location for debris accumulation.

Similarly, the paddle assemblies (41) are designed specifically to inhibit the collection of debris or the likelihood of debris being wrapped around the paddle shafts. The paddle vanes (43) are mounted in the R and are attached directly to the paddle axle shafts or hubs (47). Between the adjacent paddle vanes (43) are triangular pieces or triangle supports (45) that support the paddle vanes in their proper position and also operate to prevent debris from getting to the rotating hubs or axle at the paddle location. These triangular supports (45) operate to prevent debris from getting close to the rotating axle and hubs and thus prevent it from getting wrapped around the rotating assembly.

The triangular supports (45) also operate to act as a cutter to chop or cut the debris as the paddle assembly rotates to sweep the debris back into the augers. This tends to break down the straight pieces of stalks that may sit atop the corn head fingers, thus making them easier for the auger to grab and process through the combine. The paddle axle hub (47) fits over the axle (35) and is set by a screw (90) or other similar anchoring means.

Figure 17:
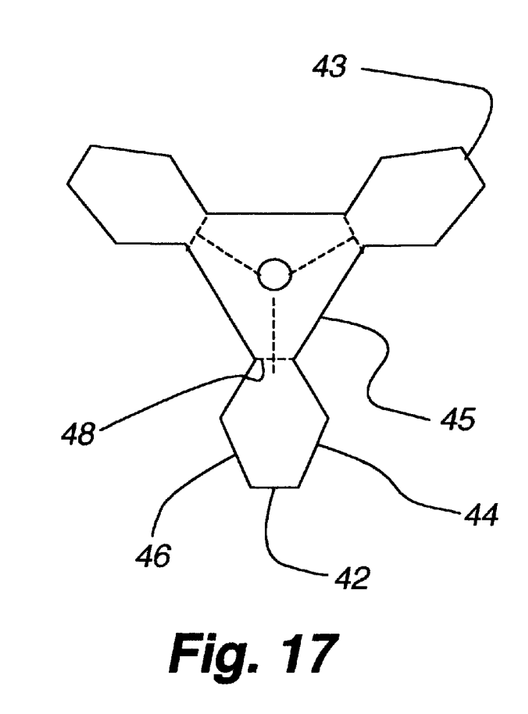
FIG. 17. is a plan view of a starting template die for forming of the paddle assemblies.

The starting form for assembly and construction of the paddle assembly (43) is shown in FIG. 17 before it is disassembled and separated along dotted lines. The template of the original plate of material is separated along dotted lines into the three paddles and the three triangular supports that fit between the paddles in the assembly. The paddles and the supports are then assembled around the shaft.

Figure 18:
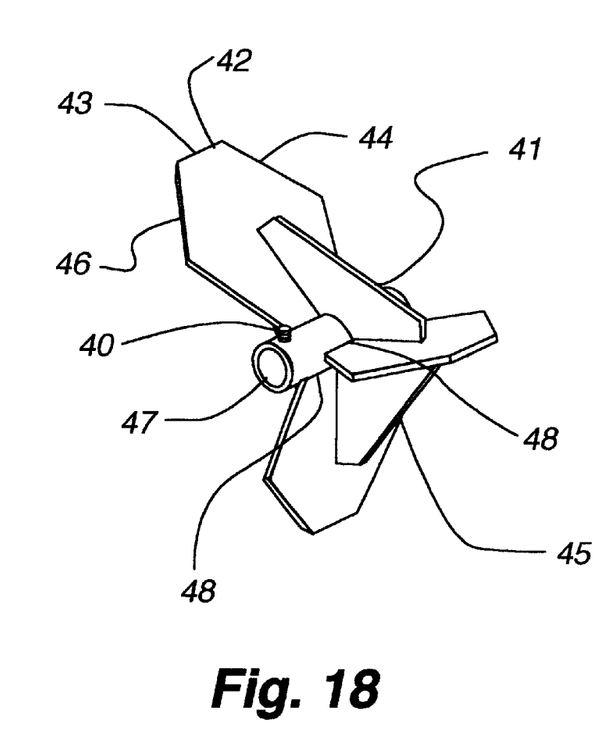
FIG. 18. is a perspective view of a finished paddle assembly from the template of FIG. 17.
Figure 19:
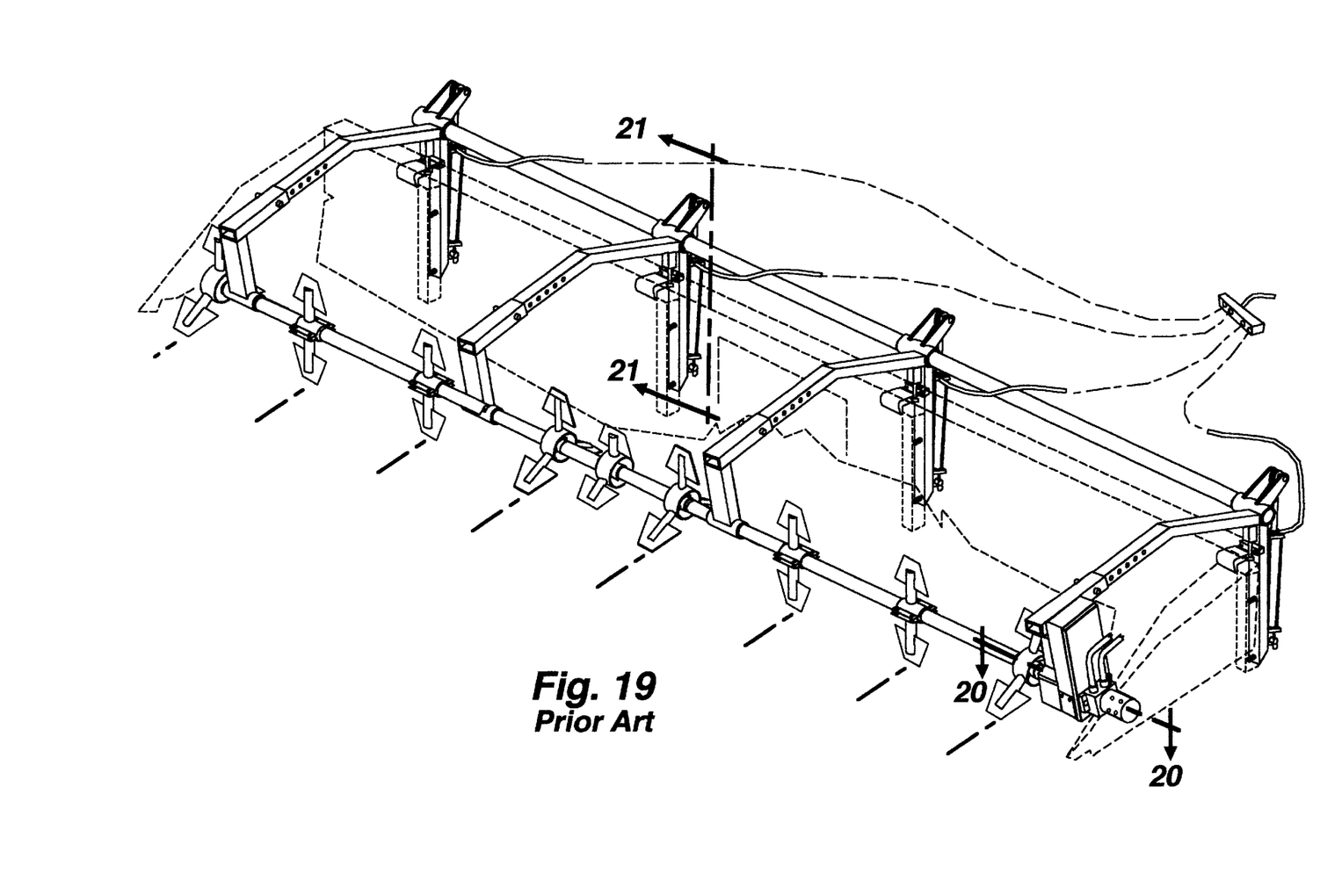
FIG. 19. is a perspective view of a prior art apparatus with different assembly paddles, frames, hydraulic motor and attachment device.
Figures 20, 21:
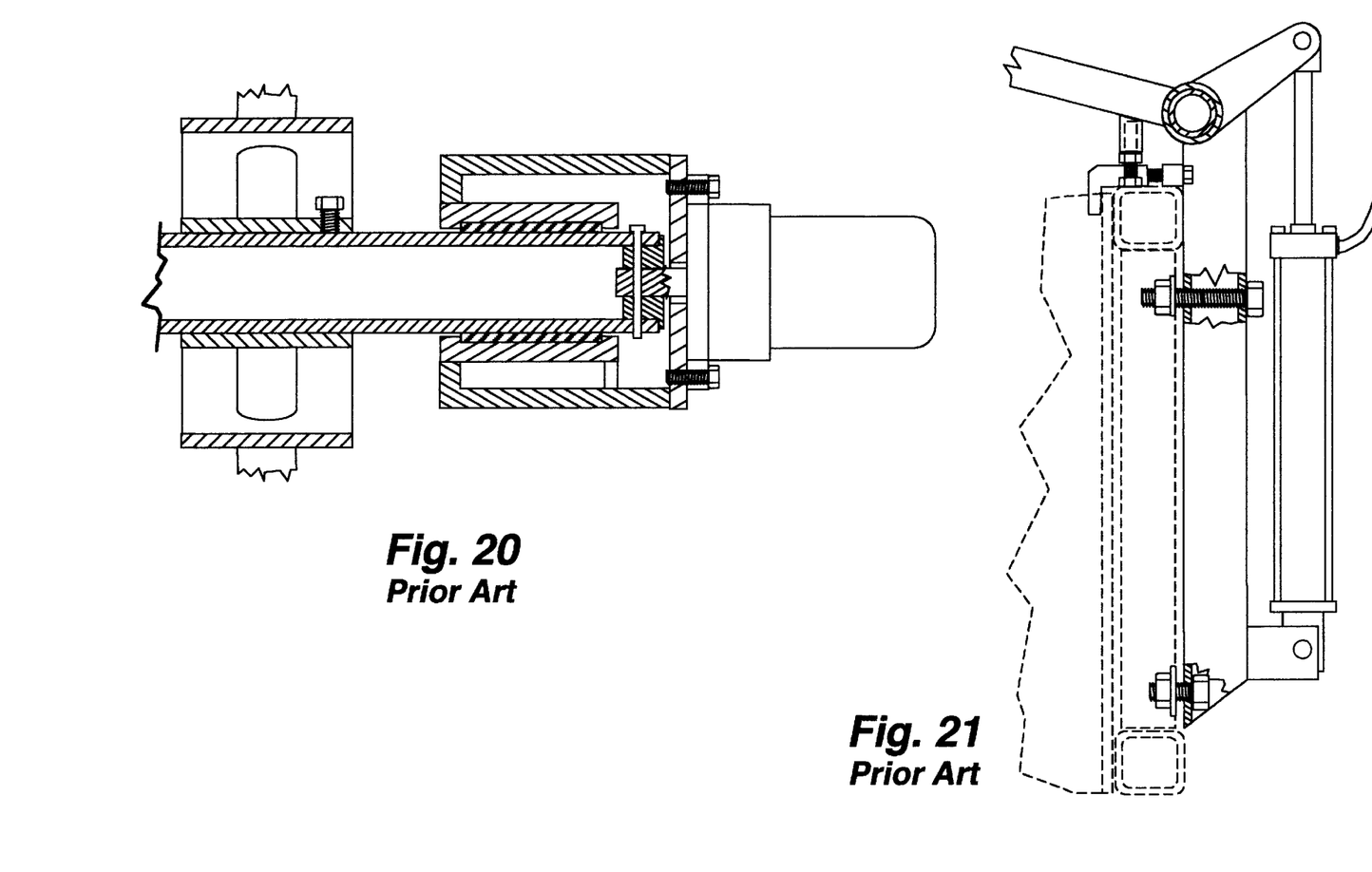
FIG. 20. is a sectional view of the hydraulic motor mount and attachment box drivingly connected to the paddles of the apparatus of FIG. 19.
FIG. 21. shows a side view of the hydraulic cylinder mounting of the prior art apparatus of FIG. 19.
Figures 22, 23, 24, 25:
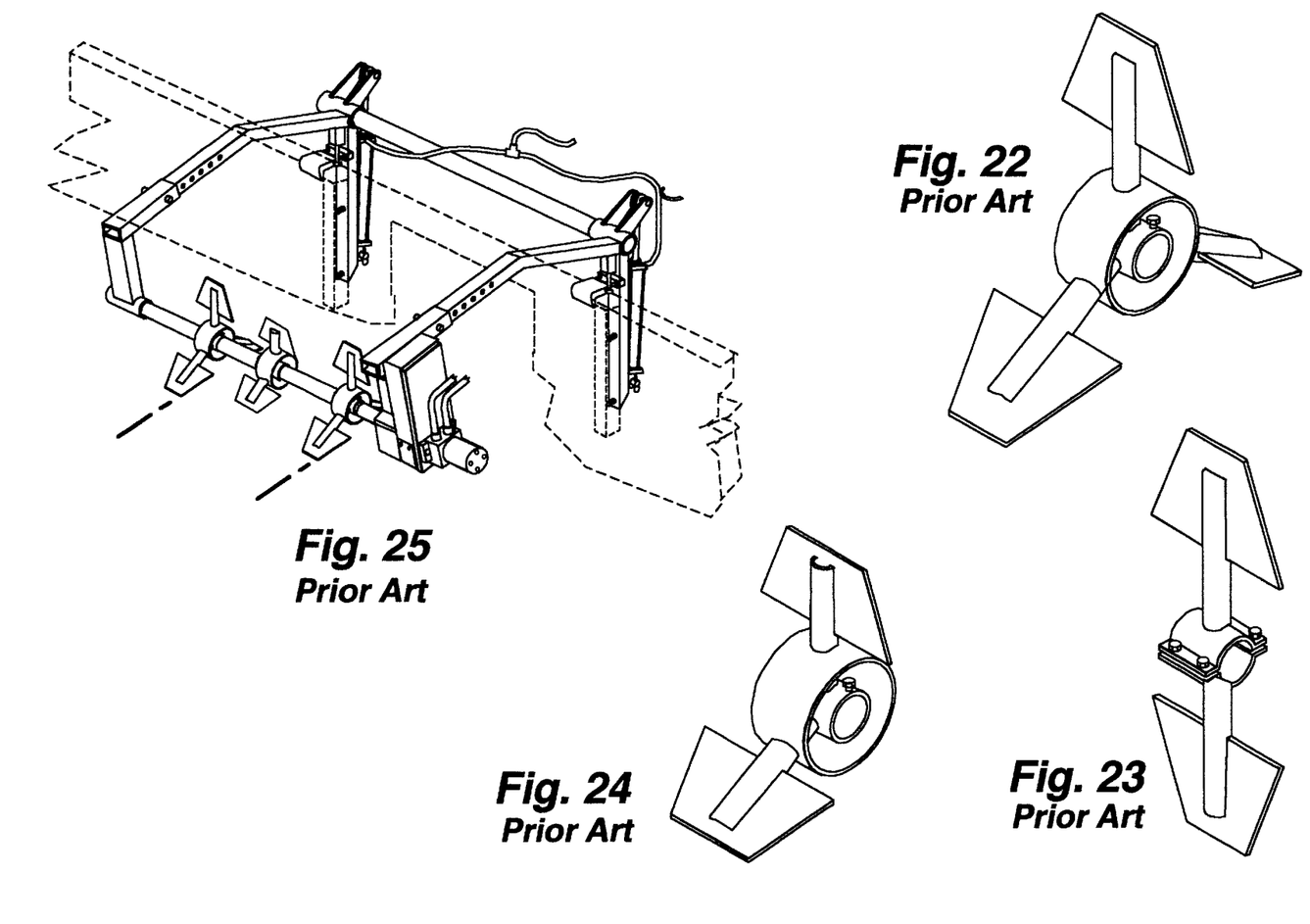
FIGS. 22–24. are perspective views of the prior art paddle assemblies used in the apparatus of FIG. 19.
FIG. 25. is a partial perspective view of the prior art apparatus showing the direct drive of the paddle assembly of FIG. 22.

The paddle vane (43) shape is also an improvement over the paddle design in the prior art apparatus, as shown in FIG. 19 through FIG. 25. The improved design has advantages of simplicity of construction, as mentioned above, and minimized usage of material. The tapered shape at the distal portion of the vane (43) fits between the fingers of the corn head and thus reaches further into the spacing to help clear debris. The vane configuration has an outer edge (42), base edge (48) and opposite side edges (44, 46). The overall shape is a double truncated diamond with the side edges (44, 46) tapering outward from the base edge (48) to a maximum width in the middle portion of the vane and then tapering inwardly toward the outer edge (42) as shown in FIG. 18. The base edge (48) is suitably secured directly to the hub (47).

As an alternative, the paddle vane (43) may be tapered at the side edges (44, 46) with the widest point being nearer the axle hub (47), without taking away from the advantages discussed herein. This taper aids in the prevention of debris buildup in that there is no sharp edge or space between the hub (47) and vane (43) to catch twine or fibers as in the embodiment shown in FIG. 23.

Additionally the paddle assembly with the base edge (48) of the paddle vane (43) adjacent to the paddle axle shaft or hub (47) leaves little room for debris to get between the paddle and the paddle axle shaft. Also the triangular support pieces form a barrier to debris getting around or between the paddle vanes (43). The triangular support pieces also act as rotating disc cutters or choppers to cut through debris. In the old prior art design, as shown in the FIGS. 22, 23, 24 and 25, the paddles were placed on stems which in turn had to be placed on the paddle axle shaft. The stems held the paddles and would allow the debris to get around the stems, under the paddles and build up and wrap around the paddle axle shafts and the axle.

The axle on the older design allowed open access for the debris to get to the axle and into the paddle base. The present invention prevents these accumulation points, by having spacers or collars protect the axle and close off the area underneath the paddle axle shaft. In one embodiment, the spacers fit and rotate with the paddle axle shaft or hub, forming a unified rotation assembly. This has the advantage that the area underneath the spacers and the axle are shielded from the debris.

The old design as shown in the FIGS. 19 through 25 was originally designed by the present inventor. This model was sold in the Nebraska area for approximately 1 year and 6 months prior to the provisional application that this application relies upon for its priority date. The design improvements that are claimed herein were not part of the original design or the machinery that was sold or offered.

I claim:

1. A sweeper assembly apparatus for aiding a corn head for harvesting corn, said corn head having a series of laterally spaced fingers, the apparatus comprising:
 a) one or more clamps to attach the sweeper assembly to the corn head;
 b) one or more support arms pivotally attached to each clamp, to allow adjustment of the placement of the sweeper assembly with respect to the corn head;
 c) an axle rotatably attached to the support arms;
 d) one or more paddle assemblies attached to the axle to rotate with the axle;
 e) a power source and motor having a drive connection to said axel to rotate the axle and paddle assemblies; and
 f) the paddle assemblies include a plurality of paddle vanes that are directly attached to a paddle hub which is adjustably attached to the axel in order to rotate with the axel.

2. The apparatus of claim 1 wherein said motor includes a means to allow for different rotational speeds of the axle.

3. The apparatus of claim 2 wherein said motor is a single speed motor and a said drive connection provides different axle speeds.

4. The apparatus of claim 3 wherein the motor drive connection is a changeable chain drive to create different speeds of the axle.

5. The apparatus of claim 3 wherein the drive connection is changeable to allow different axles to be used.

6. The apparatus of claim 1 wherein the support arm length is adjustable to allow changes in the position of the axle relative to the corn head.

7. The apparatus of claim 1 which further includes an adjustment means to adjust the position of the axle and paddle assemblies relative to the corn head.

8. The apparatus of claim 7 wherein the adjustment means is one or more hydraulic cylinders.

9. The apparatus of claim 7 wherein a height adjustment screw adjusts the final elevation of the paddle assemblies relative to the corn head.

10. The apparatus of claim 1 wherein the paddle assemblies have vanes each having an outer edge and side edges, the side edges are shaped to taper inward toward the outer edge in order to fit the corn head.

11. The apparatus of claim 1 wherein the paddle vanes are attached to the axle shaft axel hub by triangular supports which extend radially from the axle hub to hold and separate the paddle vanes.

12. The apparatus of claim 1 where wherein the multiple paddle assemblies are suitably spaced from each other so that each paddle assembly fits between adjacent corn head fingers.

13. The apparatus of claim 1 wherein the paddle assemblies are adjustably attached to axle by set screws in the paddle hub which clamp onto the axle.

14. The apparatus of claim 10 where the paddle assemblies are separated by spacers that enclose the axle.

15. The apparatus of claim 1 wherein the clamps are removably attached to the corn head.

16. The apparatus of claim 15 wherein a support arm is mounted on a pivot point attachment at a corresponding clamp, said support arm being pivotally moved by a hydraulic cylinder to adjust the position of said support arm and said apparatus.

17. A sweeper assembly apparatus for aiding a corn head for harvesting corn, said corn head having a series of laterally spaced fingers, the apparatus comprising:
 a) one or more clamps to attach the sweeper assembly to the corn head;
 b) one or more support arms pivotally attached to each clamp, to allow adjustment of the placement of the sweeper assembly with respect to the corn head;

c) an axel rotatably attached to the support arms;

d) one or more paddle assemblies attached to the axel to rotate with the axel;

e) a power source and a motor having a drive connection to said axel to rotate the axel and paddle assemblies; and f) the paddle assemblies each have a plurality of vanes and the vanes are attached to an axel hub by triangular supports which extend radially from the axel hub to hold and separate the paddle vanes.

18. A sweeper assembly apparatus for aiding a corn head for harvesting corn, said corn head having a series of laterally spaced fingers, the apparatus comprising:

a) one or more clamps to attach the sweeper assembly to the corn head;

b) one or more support arms pivotally attached to each clamp, to allow adjustment of the placement of the sweeper assembly with respect to the corn head;

c) an axel rotatably attached to the support arms;

d) one or more paddle assemblies attached to the axel to rotate with the axel;

e) a power source and a motor having a drive connection to said axel to rotate the axel and paddle assemblies;

f) each of the paddle assemblies have a plurality of vanes, each vane having an outer edge and side edges, the side edges are shaped to taper inwardly toward the outer edge in order to fit between the corn head fingers; and g) the adjacent paddle assemblies are separated by spacers that enclose the axel to allow the paddle assemblies to laterally correspond with the corn head fingers.

* * * * *